(12) United States Patent
Yasui et al.

(10) Patent No.: US 8,399,112 B2
(45) Date of Patent: Mar. 19, 2013

(54) BATTERY MODULE AND BATTERY PACK USING THE SAME

(75) Inventors: Shunsuke Yasui, Osaka (JP); Hiroshi Takasaki, Osaka (JP); Toshiki Itoi, Nara (JP); Shinya Geshi, Osaka (JP); Daisuke Kishii, Osaka (JP)

(73) Assignee: Panasonic Corporation, Osaka (JP)

( * ) Notice: Subject to any disclaimer, the term of this patent is extended or adjusted under 35 U.S.C. 154(b) by 34 days.

(21) Appl. No.: 13/127,897

(22) PCT Filed: Jul. 9, 2010

(86) PCT No.: PCT/JP2010/004485
§ 371 (c)(1),
(2), (4) Date: May 5, 2011

(87) PCT Pub. No.: WO2011/007533
PCT Pub. Date: Jan. 20, 2011

(65) Prior Publication Data
US 2011/0212348 A1 Sep. 1, 2011

(30) Foreign Application Priority Data
Jul. 17, 2009 (JP) .................................. 2009-168516

(51) Int. Cl.
*H01M 10/42* (2006.01)

(52) U.S. Cl. ............................................. 429/7; 429/82

(58) Field of Classification Search ................. 429/7, 82, 429/83
See application file for complete search history.

(56) References Cited

U.S. PATENT DOCUMENTS

| 2003/0157399 A1* | 8/2003 | Ikeuchi et al. ............... 429/62 |
| 2005/0079408 A1 | 4/2005 | Hirano |

(Continued)

FOREIGN PATENT DOCUMENTS

| DE | 198 10 746 A1 | 9/1999 |
| EP | 2 339 672 A1 | 6/2011 |

(Continued)

OTHER PUBLICATIONS

Extended European Search Report issued in European Application No. 10799597.9 issued on Jun. 22, 2012.

*Primary Examiner* — Mark F Huff
*Assistant Examiner* — Monique Wills
(74) *Attorney, Agent, or Firm* — McDermott Will & Emery LLP

(57) ABSTRACT

A battery module 100 includes a plurality of batteries aligned and accommodated in a housing 20, wherein each batteries has an opening portion 17 at an electrode portion 16 of the battery to release gas generated in the battery outside the battery, the housing 20 is partitioned by a circuit board 30 disposed in contact with battery cases 5 around the electrode portions 16 of the batteries into a storage portion 54 in which the batteries are stored, and an exhaust chamber 24 via which the gas released from the opening portion 17 of the electrode portion 16 is exhausted outside the housing 20, the electrode portions 16 of the batteries are connected to a connector 32 on the circuit board 30, and the opening portions 17 of the electrode portions 16 are in communication with the exhaust chamber 24 via through holes 36 in the circuit board 30.

17 Claims, 15 Drawing Sheets

U.S. PATENT DOCUMENTS

| | | |
|---|---|---|
| 2005/0285567 A1 | 12/2005 | Kim |
| 2009/0017366 A1 | 1/2009 | Wood et al. |
| 2009/0181288 A1 | 7/2009 | Sato |
| 2009/0297892 A1* | 12/2009 | Ijaz et al. .......................... 429/7 |
| 2010/0047673 A1 | 2/2010 | Hirakawa et al. |
| 2010/0052692 A1 | 3/2010 | Yano et al. |
| 2010/0062329 A1* | 3/2010 | Muis .............................. 429/158 |
| 2010/0116570 A1 | 5/2010 | Sugawara et al. |
| 2011/0274951 A1 | 11/2011 | Yasui et al. |

FOREIGN PATENT DOCUMENTS

| | | |
|---|---|---|
| EP | 2 426 775 A1 | 3/2012 |
| JP | 2000-208118 | 7/2000 |
| JP | 2000-223166 | 8/2000 |
| JP | 2001-256949 | 9/2001 |
| JP | 2002-134078 | 5/2002 |
| JP | 2003-162993 | 6/2003 |
| JP | 2007-027011 | 2/2007 |
| JP | 2008-117756 | 5/2008 |

* cited by examiner

BATTERY MODULE AND BATTERY PACK USING THE SAME

RELATED APPLICATIONS

This application is the U.S. National Phase under 35 U.S.C. §371 of International Application No. PCT/JP2010/004485, filed on Jul. 9, 2010, which in turn claims the benefit of Japanese Application No. 2009-168516, filed on Jul. 17, 2009, the disclosures of which Applications are incorporated by reference herein.

TECHNICAL FIELD

The present invention relates to battery modules including, in particular, a plurality of batteries, wherein even when a problem such as generation of heat occurs in a battery, the problem does not influence the other batteries, and to battery packs using the same.

BACKGROUND ART

In recent years, in view of savings in resources and conservation of energy, there have been increasing demands for nickel-hydrogen secondary batteries, nickel-cadmium secondary batteries, lithium ion secondary batteries, etc. which can be used repeatedly. Among them, lithium ion secondary batteries are characterized by lightness in weight, high electromotive force, and high energy density. Thus, there are growing demands for the lithium ion secondary batteries as power sources for driving various kinds of mobile electronic devices and portable communication devices such as mobile phones, digital cameras, video cameras, and laptop personal computers.

On the other hand, to reduce used amount of fossil fuel, and to reduce the amount of emission of $CO_2$, expectations for battery packs are growing to serve as power sources for driving motors such as vehicles. Such a battery pack includes a plurality of battery modules each including one or more batteries in order to obtain a preferable voltage and capacity.

In the development of the above battery modules, downsizing the battery modules is a major challenge because the battery modules for storing predetermined electric power are accommodated in limited space, for example, in a vehicle.

For this purpose, a configuration is disclosed in which a battery assembly (a battery module) includes a plurality of batteries, and the connection between the batteries and an interconnect for detecting a voltage, temperature, or the like are implemented by patterned interconnects formed on a printed circuit board (for example, see Patent Document 1). Likewise, a power supply device (a battery pack) is disclosed in which a plurality of power modules are accommodated in a holder case, and is connected to each other by an end plate (for example, see Patent Document 2). The end plate is provided with a sensor lead and a power-supply lead for connecting the battery modules to each other, so that it is possible to reduce poor connection, and downsizing can be possible.

Moreover, as the capacity of a battery to be accommodated in a battery module increases, heat may be generated in the battery itself, and the battery may have a high temperature depending on how it is utilized. Thus, in addition to the safety of the battery itself, the safety of the battery module, which is a collection of batteries, becomes more important. That is, the internal pressure of the battery may be increased by gas generated due to overcharge, overdischarge, or an internal or external short-circuit, and thus the outer case of the battery may rupture. For this reason, generally, a battery is provided with a vent mechanism or a safety valve to release gas so that the gas in the battery is released. Here, when the released gas is, for example, ignited, smoking may occur, or in rare cases, combustion may occur, which poses a problem with reliability and safety.

For this reason, a power supply device (battery module) is disclosed in which a plurality of batteries are accommodated in a battery chamber within a case, and a partitioning wall has openings facing safety valves of the batteries, so that gas emitted from a battery in a fault state is released from an outlet via an exhaust chamber (for example, see Patent Document 3).

CITATION LIST

Patent Document

Patent Document 1: Japanese Patent Publication No. 2000-208118
Patent Document 2: Japanese Patent Publication No. 2000-223166
Patent Document 3: Japanese Patent Publication No. 2007-27011

SUMMARY OF THE INVENTION

Technical Problem

However, in the battery modules described in Patent Document 1 and Patent Document 2, when excessive heat is generated in one battery to allow the operation of the safety valve, it is not possible to control the quantity of the heat generated in the battery, or the influence of ignition of emitted gas over neighboring batteries, which causes the problem of consecutively deteriorating the batteries. That is, in a battery module including a plurality of batteries, how expansion of the influence of a battery having a problem over neighboring batteries is controlled to a minimum is a problem to be solved.

Moreover, in the battery module described in Patent Document 3, the partitioning wall of the case has the openings facing the safety valves of the batteries so that the emitted gas does not fill the battery chamber, but is released to the outside. However, Patent Document 3 discloses a circuit board built in a resin, but fails to teach or suggest, for example, a method for connecting the circuit board to the batteries. Therefore, when a surface on a safety valve side of each battery is connected to a connection terminal, it is not clear how air-tightness with respect to the partitioning wall is maintained. Moreover, it is difficult to position the safety valve of each battery to the opening portion of the partitioning wall, and thus positioning using recessed portions leaves space between the batteries, so that downsizing is not possible. Furthermore, the batteries and the circuit board are fixed and built in a resin, which poses a problem with downsizing the battery module.

The present invention was devised to solve the above problems. It is an object of the present invention to provide a battery module whose size and thickness can be reduced, and in which the influence of excessive heat generation in a battery having a problem over neighboring batteries can be controlled to a minimum, and a battery pack using the same.

Solution to the Problem

To solve the above problems, a battery module of the present invention is a battery module including a plurality of batteries aligned and accommodated in a housing, wherein each of the batteries has an opening portion at an electrode portion of the battery to release gas generated in the battery outside the battery, the housing is partitioned by a circuit board disposed in contact with battery cases around the electrode portions of the batteries into a storage portion in which the plurality of batteries are stored, and an exhaust chamber via which the gas released from the opening portion of the electrode portion is exhausted outside the housing, the electrode portions of the batteries are connected to a connector formed on the circuit board, and the opening portions of the electrode portions are in communication with the exhaust chamber via through holes formed in the circuit board.

With this configuration, the circuit board is in contact with the battery cases around the electrode portions of the batteries, and the opening portions of the electrode portions are in communication with the exhaust chamber via the through holes formed in the circuit board. Therefore, space into which gas emitted as a result of opening a vent mechanism of the battery is released can be limited to be within the through hole. Thus, the gas released from the opening portion of the electrode portion is released into the exhaust chamber via the through hole, and is further released outside the housing. Therefore, the gas can be prevented from entering neighboring batteries. Moreover, space required for routing power supply interconnects, control interconnects, etc. can significantly be reduced by the circuit board. As a result, it is possible to obtain a thin and small battery module which has substantially the same height as that of the batteries, and which is highly safe and has high reliability.

Moreover, a battery pack of the present invention includes multiple ones of the above battery module which are connected in series and/or parallel. With this configuration, a battery pack having a given voltage and capacity can be obtained according to the application.

Advantages of the Invention

According to the present invention, it is possible to obtain a battery module and a battery pack, wherein the size and the thickness of the battery module are reduced, and the influence of excessive heat generation in a battery having a problem over neighboring batteries can be controlled to a minimum.

DESCRIPTION OF EMBODIMENTS

Figure 1:
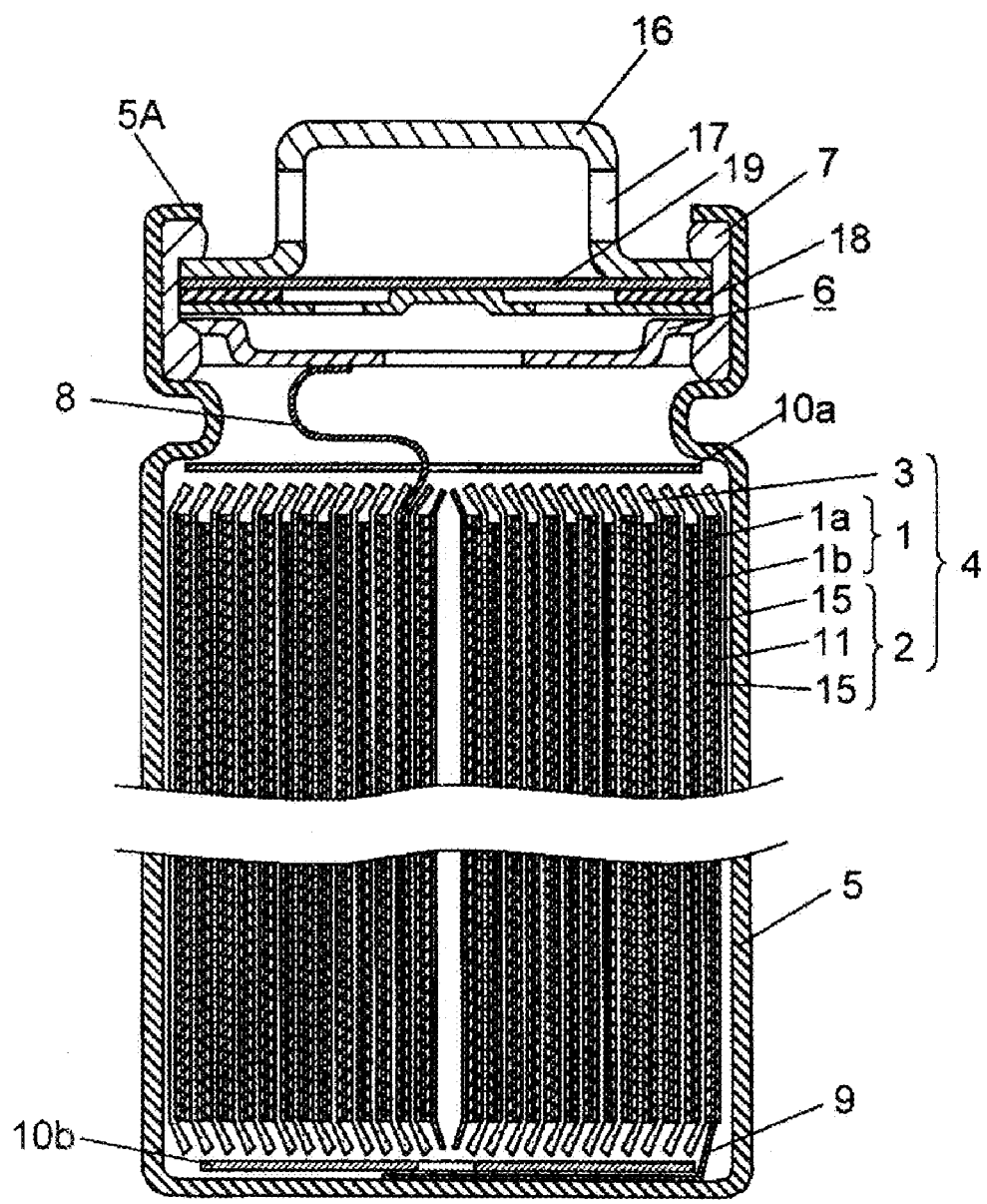
FIG. 1 is a cross-sectional view of a battery included in a battery module of a first embodiment of the present invention.

A battery module according to the present invention is a battery module including a plurality of batteries aligned and accommodated in a housing, wherein each of the batteries has an opening portion at an electrode portion of the battery to release gas generated in the battery outside the battery, the housing is partitioned by a circuit board disposed in contact with battery cases around the electrode portions of the batteries into a storage portion in which the plurality of batteries are stored, and an exhaust chamber via which the gas released from the opening portion of the electrode portion is exhausted outside the housing, the electrode portions of the batteries are connected to a connector formed on the circuit board, and the opening portions of the electrode portions are in communication with the exhaust chamber via through holes formed in the circuit board.

With this configuration, the circuit board is in contact with the battery cases around the electrode portions of the batteries, and the opening portions of the electrode portions are in communication with the exhaust chamber via the through holes formed in the circuit board. Therefore, space into which gas emitted as a result of opening a vent mechanism of the battery is released can be limited to be within the through hole. Thus, the gas released from the opening portion of the electrode portion is released into the exhaust chamber via the through hole, and is further released outside the housing. Therefore, the gas can be prevented from entering neighboring batteries. Moreover, space required for routing power supply interconnects, control interconnects, etc. can significantly be reduced by the circuit board. As a result, it is possible to obtain a thin and small battery module which has substantially the same height as that of the batteries, and which is highly safe and has high reliability.

Here, it is preferable that the electrode portions of the batteries be inserted in the through holes of the circuit board. With this configuration, gas released from the opening portion of the electrode portion can efficiently be released outside the housing via the through hole.

Moreover, it is preferable that the circuit board have a layered structure including a heat-resistant member and an elastic member, and a lower surface of the elastic member be in contact with the battery cases. With this configuration, the circuit board can closely be in contact with the battery cases, so that it is possible to further improve sealing of the storage portion.

Moreover, it is preferable that the connector be formed on an upper surface of the circuit board, and a lower surface of the circuit board be in contact with the battery cases. With this configuration, the electrode portions inserted in the through holes of the circuit board can easily be connected to the connector.

Moreover, it is preferable that the height of each electrode portion be substantially the same as the thickness of the circuit board. With this configuration, the electrode portions inserted in the through holes in the circuit board can more easily be connected to the connector.

Moreover, the size of each through hole formed in the circuit board is preferably smaller on a side on which the circuit board is in contact with the battery case than on a side on which the circuit board is provided with the connector. With this configuration, gas released from the opening portion of the electrode portion can efficiently be released outside the housing.

Moreover, the opening portion of each electrode portion may be provided at an upper surface of the electrode portion, and the connector connected to the electrode portions may have through holes formed at least in positions of the connector corresponding to the opening portions. With this configuration, gas released from the opening portion of the electrode portion is directly released into the exhaust chamber via the through hole, so that it is possible to efficiently release the gas outside the housing.

Moreover, the connector connected to the electrode portions is preferably formed to straddle the plurality of through holes formed in the circuit board. With this configuration, the electrode portions in the through holes can easily be connected to the connector.

Moreover, it is preferable that the opening portion of each electrode portion be provided at a side surface of the electrode portion, and a gap be provided between the circuit board and the electrode portion in each through hole formed in the circuit board. With this configuration, gas released from the opening portion of the electrode portion is released into the exhaust chamber through the gap, so that the gas can efficiently be released outside the housing.

Moreover, the plurality of batteries are preferably connected in parallel by the connector connected to the electrode portions of the batteries. With this configuration, it is possible to form a battery module having a high capacity with the size of the battery module being reduced.

Moreover, the storage portion is sealed by the circuit board. With this configuration, it can be ensured that gas released from the opening portion of the electrode portion is released outside the housing via the through hole and the exhaust chamber without influencing the other batteries. Note that "sealed" does not necessarily mean a completely sealed state, but includes such a sealed state that gas in an amount having no influence returns from the exhaust chamber to the storage portion.

Moreover, the housing is preferably made of a metal material having an insulated surface. With this configuration, for example, ignition due to supply of oxygen through a hole, or the like formed by melting the housing by emitted high-temperature gas can be prevented, and exhaustion of the gas via the exhaust chamber can be ensured.

Moreover, it is preferable that the housing include the storage portion and a lid body, partition portions be provided in the storage portion in such a manner that the batteries are individually stored, and the lid body include rib portions at positions facing the partition portions of the housing. With this configuration, heat transmission to neighboring batteries or heat dissipation can significantly be reduced, and it is ensured that the circuit board is sandwiched between the partition portions and the rib portions, so that it is possible to further improve sealing properties between the storage portion and the exhaust chamber.

Alternatively, the housing may include the storage portion and a lid body, and a supporting member for holding the circuit board may further be provided between the lid body and the circuit board. With this configuration, it is possible to further improve sealing properties between the storage portion and the exhaust chamber.

A battery pack of the present invention includes multiple ones of the above battery module which are connected in series and/or parallel. With this configuration, it is possible to obtain a battery pack having a given voltage and capacity depending on the application.

Embodiments of the present invention will be described below with reference to the drawings, where the use of the same reference symbols in different drawings indicates similar or identical items. The present invention is not limited to the below described contents as long as it is based on the basic features described in this specification. As a battery, a non-aqueous electrolyte secondary battery, e.g., a lithium ion secondary battery, in a cylindrical shape (hereinafter referred to as a "battery") will be described below by way of example, but of course, the invention is not limited to these embodiments.

First Embodiment

FIG. 1 is a cross-sectional view of a battery included in a battery module of a first embodiment of the present invention. Note that although a battery module including a plurality of batteries connected in parallel will be described below by way of example, a battery module including batteries connected in series may be possible.

As illustrated in FIG. 1, the battery in a cylindrical shape includes an electrode group 4 in which a positive electrode 1 and a negative electrode 2 are wound with a separator 3 interposed therebetween. The positive electrode 1 includes a positive electrode lead 8 made of, for example, aluminum. The negative electrode 2 faces the positive electrode 1. One end of the negative electrode 2 is provided with a negative electrode lead 9 made of, for example, copper. Insulating plates 10a, 10b are installed above and below the electrode group 4, and the electrode group 4 with the insulating plates 10a, 10b is inserted in a battery case 5. The other end of the positive electrode lead 8 is welded to a sealing plate 6. The other end of the negative electrode lead 9 is welded to a bottom of the battery case 5. A nonaqueous electrolyte (not shown) capable of conducting lithium ions is injected in the battery case 5. An opening end of the battery case 5 is crimped to a positive electrode cap 16 included in one electrode portion, a current cutoff member 18 such as a PTC element, and the sealing plate 6 via a gasket 7. The positive electrode 1 includes a positive electrode current collector 1a and a positive electrode layer 1b containing a positive electrode active material.

Here, the positive electrode cap 16 protrudes from an upper surface 5A of the opening end of the battery case 5. A side surface of the positive electrode cap 16 is provided with an opening portion 17 to release gas resulting from opening of a vent mechanism 19 such as a safety valve due to a problem in the electrode group 4. Note that the height of a portion of the positive electrode cap 16 which protrudes from the upper surface 5A is almost the same as the thickness of, for example, a circuit board, which will be described below. Although an example in which the positive electrode cap 16 is provided to protrude from the upper surface 5A of the battery case 5 will be described below, a battery having a positive electrode cap provided to be flush with an upper surface 5A of a battery case 5 may be possible.

Here, the positive electrode layer 1b contains, as the positive electrode active material, for example, a lithium-containing compound oxide such as $LiCoO_2$, $LiNiO_2$, $Li2MnO_4$, a mixture of these materials, or a complex compound of these materials. The positive electrode layer 1b further contains a conductive agent and a binder. Examples of the conductive agent include graphites such as natural graphite and artificial graphite, and carbon blacks such as acetylene black, ketjen black, channel black, furnace black, lamp black, and thermal black. Examples of the binder include PVDF, polytetrafluoroethylene, polyethylene, polypropylene, an aramid resin, polyamide, polyimide, etc.

Moreover, as the positive electrode current collector 1a used for the positive electrode 1, aluminum (Al), carbon (C), or a conductive resin can be used.

As the nonaqueous electrolyte, an electrolyte solution obtained by dissolving a solute in an organic solvent, or a so-called polymer electrolyte layer including the electrolyte solution solidified by macromolecules can be used. As the solute of the nonaqueous electrolyte, $LiPF_6$, $LiBF_4$, $LiClO_4$, $LiAlCl_4$, $LiSbF_6$, $LiSCN$, $LiCF_3SO_3$, $LiN(CF_3CO_2)$, $LiN(CF_3SO_2)_2$, or the like can be used. Furthermore, as the organic solvent, for example, ethylene carbonate (EC), propylene carbonate, butylene carbonate, vinylene carbonate, dimethyl carbonate (DMC), diethyl carbonate, ethyl methyl carbonate (EMC), or the like can be used.

Moreover, a negative electrode current collector 11 of the negative electrode 2 can be metal foil made of stainless steel, nickel, copper, titanium, or the like, or thin film made of carbon or a conductive resin.

Furthermore, as negative electrode layers 15 of the negative electrode 2, a negative electrode active material, e.g., silicon (Si), tin (Sn), or a carbon material such as graphite, which is capable of reversibly inserting and extracting lithium ions, and has a theoretical capacity density of 833 $mAh/cm^3$ or higher can be used.

A battery module of the first embodiment of the present invention will be described in detail below with reference to FIGS. 2A-2C, 3, 4A, 4B, and 5.

Figure 2A:
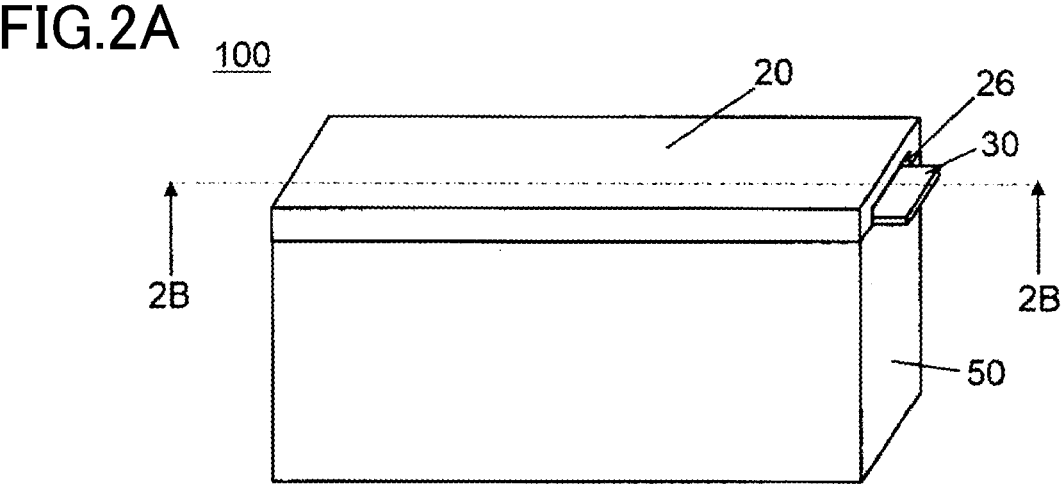
FIG. 2A is a perspective view of the battery module of the first embodiment of the present invention.
Figure 2B:
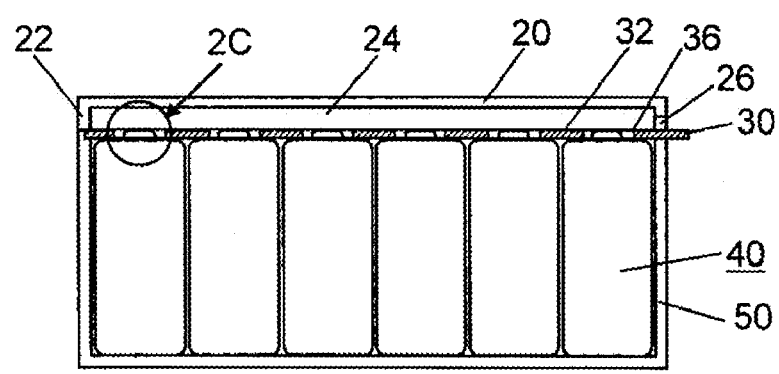
FIG. 2B is a cross-sectional view along the line 2B-2B of FIG. 2A.
Figure 2C:
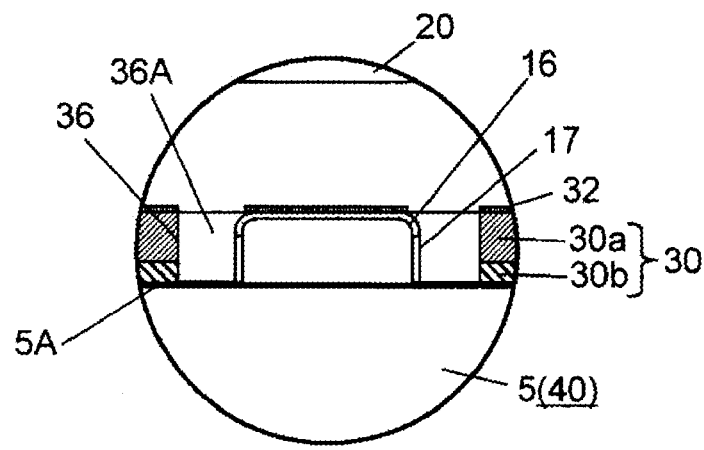
FIG. 2C is an enlarged cross-sectional view of the part 2C of FIG. 2B.
Figure 3:
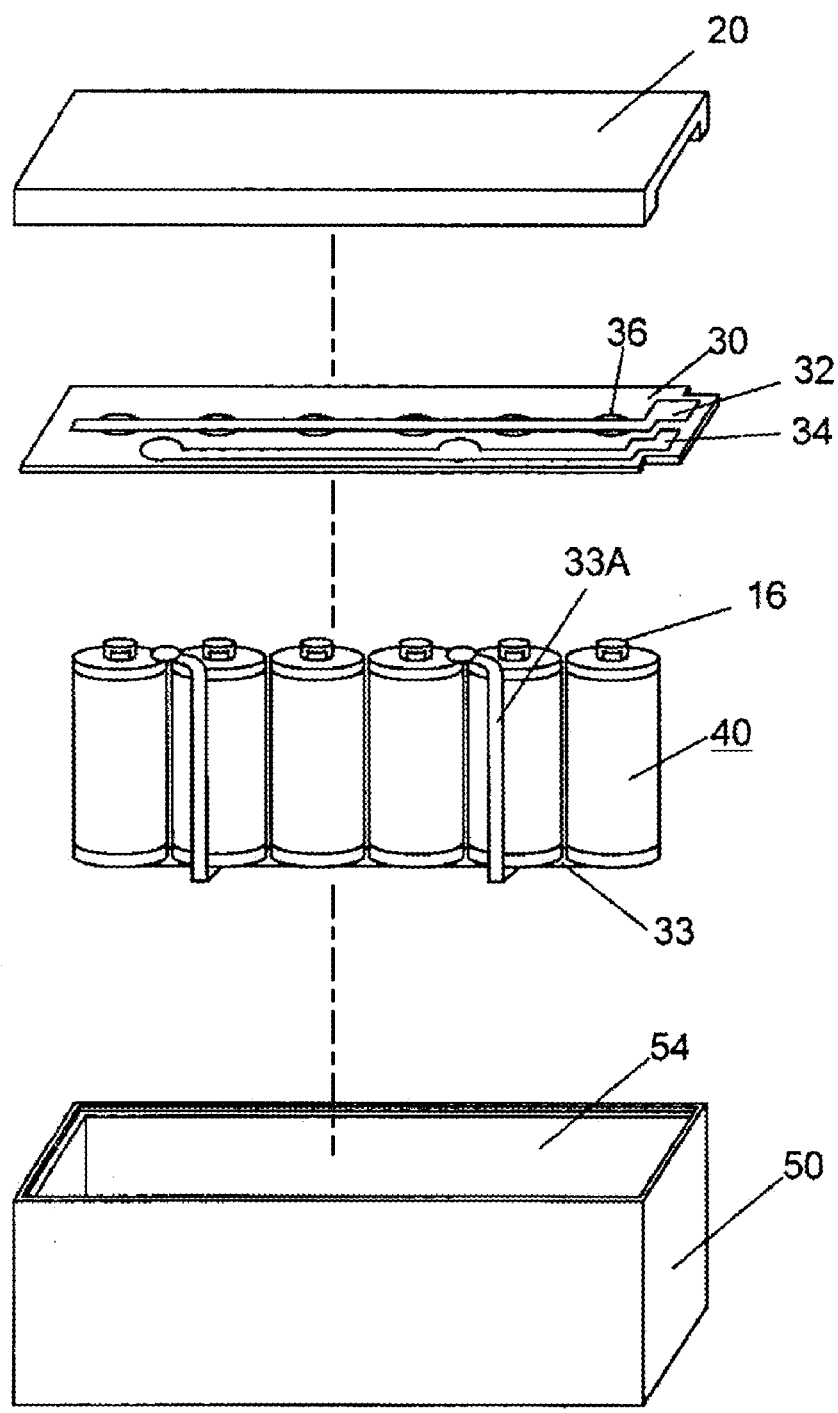
FIG. 3 is an exploded perspective view illustrating the battery module of the first embodiment of the present invention.

FIG. 2A is a perspective view illustrating the battery module of the first embodiment of the present invention. FIG. 2B is a cross-sectional view along the line 2B-2B of FIG. 2A. FIG. 2C is an enlarged cross-sectional view of the part 2C of FIG. 2B. FIG. 3 is an exploded perspective view of the battery module of the first embodiment of the present invention.

As illustrated in FIGS. 2A and 3, a battery module 100 includes a housing 50 made of an insulating resin material such as a polycarbonate resin, and a lid body 20 fitting into the housing 50.

As illustrated in FIGS. 2B and 3, a battery unit 40 is stored in the housing 50. The battery unit 40 is formed in such a manner that a plurality of batteries whose positive electrode caps 16 are aligned in the same direction are electrically connected in parallel by connectors 32, 34 of a circuit board 30. Moreover, a connection plate 33 by which bottoms each serving as one of electrode portions (negative electrode) of the battery are connected in parallel is connected to the connector 34 of the circuit board 30 by extension portions 33A each extending from a part of the connection plate 33.

Moreover, as illustrated in FIG. 2C, the positive electrode caps 16 protruding from the battery cases 5 are inserted inside through holes 36 in the circuit board 30, where the through holes 36 are provided for the batteries, respectively. The positive electrode caps 16 are connected to the connector 32 of the circuit board 30. Here, the circuit board 30 is in contact with and closely attached to the battery cases 5, and each through hole 36 has a gap 36A so that the opening portion 17 provided in the side surface of the positive electrode cap 16 is not covered. The gap 36A serves as space into which gas emitted from the opening portion 17 of the positive electrode cap 16 on the occurrence of a problem in the battery is released.

Then, as illustrated in FIGS. 2B and 3, the emitted gas passes through the gap 36A between the connector 32 of the circuit board 30 and the positive electrode cap in the through hole 36, and also through space in an exhaust chamber 24 of the lid body 20, and then is released from an opening 26 in communication with the outside.

Components included in the battery module 100 will be described below with reference to the drawings.

First, as illustrated in FIG. 3, the housing 50 includes an opening end on a side on which the lid body 20 is fitted into the housing 50, and a storage portion 54 into which the plurality of batteries are installed from the opening end side. Here, when batteries each have, for example, an outer diameter of 18 mm, and a height of 65 mm, the height of the storage portion 54 is approximately a value obtained by adding the thickness of the connection plate 33 to 65 mm.

Moreover, as illustrated in FIGS. 2B and 3, the lid body 20 includes the exhaust chamber 24 formed by external walls 22, and the opening 26 provided in a part of the external walls 22.

Moreover, as illustrated in FIG. 2C, the circuit board 30 has a layered structure including at least two layers, a heat-resistant member 30a made of, for example, a glass and epoxy substrate or polyimide, and an elastic member 30b having, for example, rubber elasticity. Since the elastic member 30b elastically deforms and comes closely in contact with the upper surfaces 5A of the battery cases 5, a high degree of air-tightness can be ensured. Note that as long as a high degree of air-tightness can be ensured, it is not particularly necessary for the circuit board 30 to have the layered structure. Moreover, the circuit board 30 includes the connector 32 which is to be connected to the positive electrode caps 16 of the batteries inserted in the through holes 36, and the connector 34 which is to be connected to the extension portions 33A of the connection plate 33 connecting the other electrodes (e.g., negative electrodes) of the batteries in parallel. The connector 32 is provided to straddle the through holes 36 such that the connector 32 does not completely cover the through holes 36. Note that the connector 32 and the connection plate 33 are made of, for example, a nickel plate, a Cu plate, an Al plate, or a lead wire, and the connection plate 33 is connected to the connector 34 made of copper foil, or the like by, for example, soldering. Moreover, connection of the positive electrode caps 16 to the connector 32, and connection of the negative electrodes to the connection plate 33 are achieved by, for example, electric welding or spot welding.

In this way, the batteries included in the battery module can be connected by the circuit board, so that it is possible to significantly reduce space required for routing a power supply interconnect or a control interconnect. Moreover, the opening portions of the positive electrode caps of the batteries are placed in the through holes of the circuit board. As a result, gas emitted from a battery on the occurrence of a problem cannot enter neighboring battery cases, and thus even if the gas is ignited for combustion, flames can be prevented from entering the neighboring battery cases, and blocking the effect of the flames can be ensured.

The operation and advantages of the battery module 100 of the present embodiment in case of, for example, excessive heat generation in one of the batteries connected in parallel in the battery module 100 will be described below with reference to FIGS. 4A and 4B.

Figure 4A:
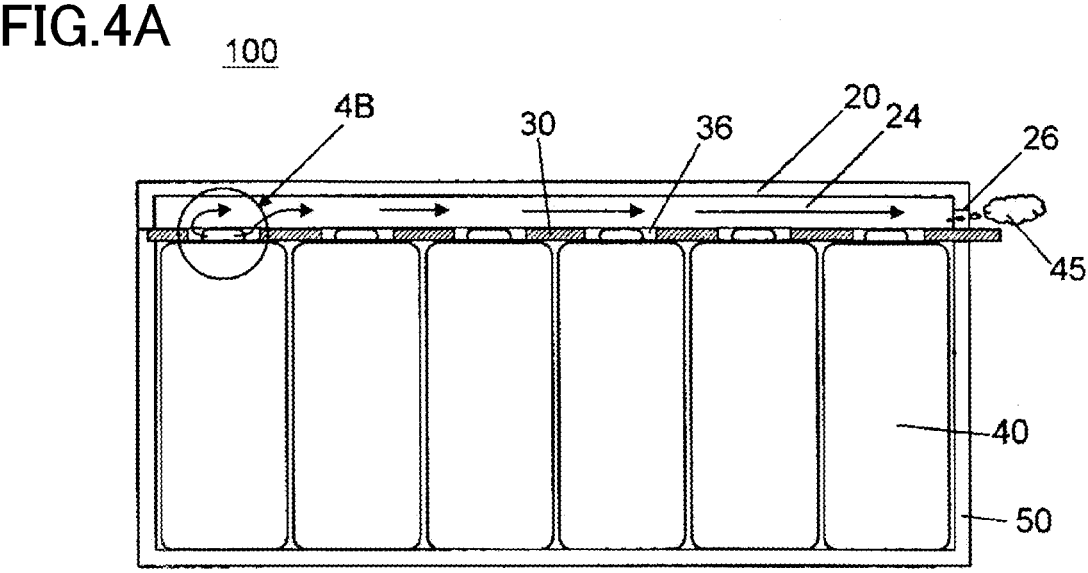
FIG. 4A is a cross-sectional view illustrating exhaustion of gas emitted in case of, for example, excessive heat generation in one of the batteries of the battery module of the first embodiment of the present invention.

FIG. 4A is a cross-sectional view illustrating exhaustion of gas emitted in case of, for example, excessive heat generation in one of the batteries in the battery module 100 of the present embodiment. FIG. 4B is an enlarged cross-sectional view illustrating the part 4B of FIG. 4A.

Figure 4B:
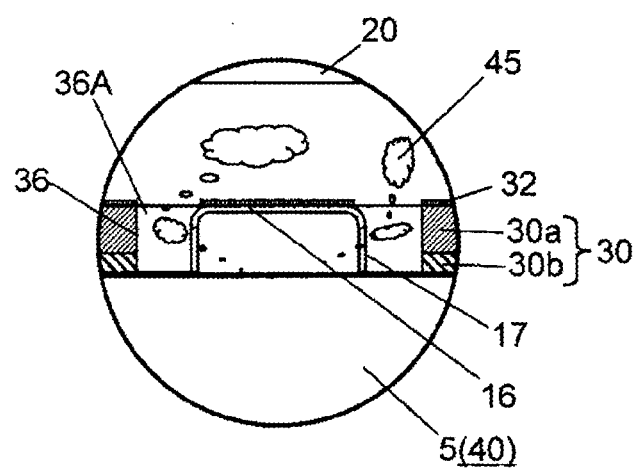
FIG. 4B is an enlarged cross-sectional view of the part 4B of FIG. 4A.

First, as illustrated in FIG. 4B, excessive heat is generated in one of the batteries of the battery module 100, which increases the gas pressure of gas generated in the battery case, thereby operating, for example, a safety valve serving as a vent mechanism, so that gas 45 is emitted from the battery case. Then, the emitted gas 45 is emitted through the opening portion 17 of the positive electrode cap 16 into the gap 36A of the through hole 36 inside which the positive electrode cap 16 is inserted.

Next, as illustrated in FIG. 4A, the gas 45 does not fill the gap 36A, but is exhausted into the exhaust chamber 24 of the lid body 20 via the through hole 36 which is not covered by the connector 32 of the circuit board 30. Then, the gas 45 is eventually released outside the battery module 100 through the opening 26 provided in the lid body 20.

Here, when the gas 45 is rapidly emitted from the battery having a problem in the battery module 100, a risk that combustion of the gas is produced by, for example, ignition generally increases.

However, in the battery module 100 having the above configuration of the present invention, the amount of oxygen in the gap 36A in the through hole 36 is limited, and no oxygen is further supplied from the outside. Thus, the possibility of ignition of the gas is very low. As a result, the gas 45 is exhausted in a gaseous state via the through hole 36 of the circuit board 30. Therefore, explosive expansion due to the ignition of the gas is not caused. Thus, there is no rupture of the battery module.

According to the present embodiment, the battery module is stored in the storage portion of the housing, under a sealed state by at least the circuit board and the housing, and gas emitted from a battery having a problem can be released, in a gaseous state, outside the battery module through the gap of the through hole of the circuit board. As a result, it is possible to obtain a battery module in which the gas is not ignited for combustion or to generate smoke, and which is highly safe.

Moreover, the batteries included in the battery module can be stored in the storage portion of the housing, under the sealed state by at least the circuit board and the housing, so that it is not necessary to individually store the batteries. As a result, the battery module can easily be downsized. Moreover, space required for routing the power supply interconnect or the control interconnect can significantly be reduced by the circuit board. As a result, it is possible to obtain a battery module which is smaller in size, and has high safety and high reliability.

Note that in the present embodiment, the lid body 20 made of an insulating material such as a polycarbonate resin has been described, but the invention is not limited to this embodiment. For example, a metal material such as aluminum, or the metal material covered with an insulating resin may be used. With this configuration, the mechanical strength can be improved to obtain a lid body having a reduced thickness, thereby further downsizing the battery module. Moreover, high thermal-conductivity of the metal material enhances the capability of cooling emitted gas, so that it is also possible to obtain a highly reliable battery module which is less likely to be ignited. Moreover, forming a hole by melting the lid body by the emitted high-temperature gas is prevented to prevent, for example, ignition by supply of oxygen through the hole, which makes it possible to ensure exhaustion of the gas via the exhaust chamber.

Figure 5:
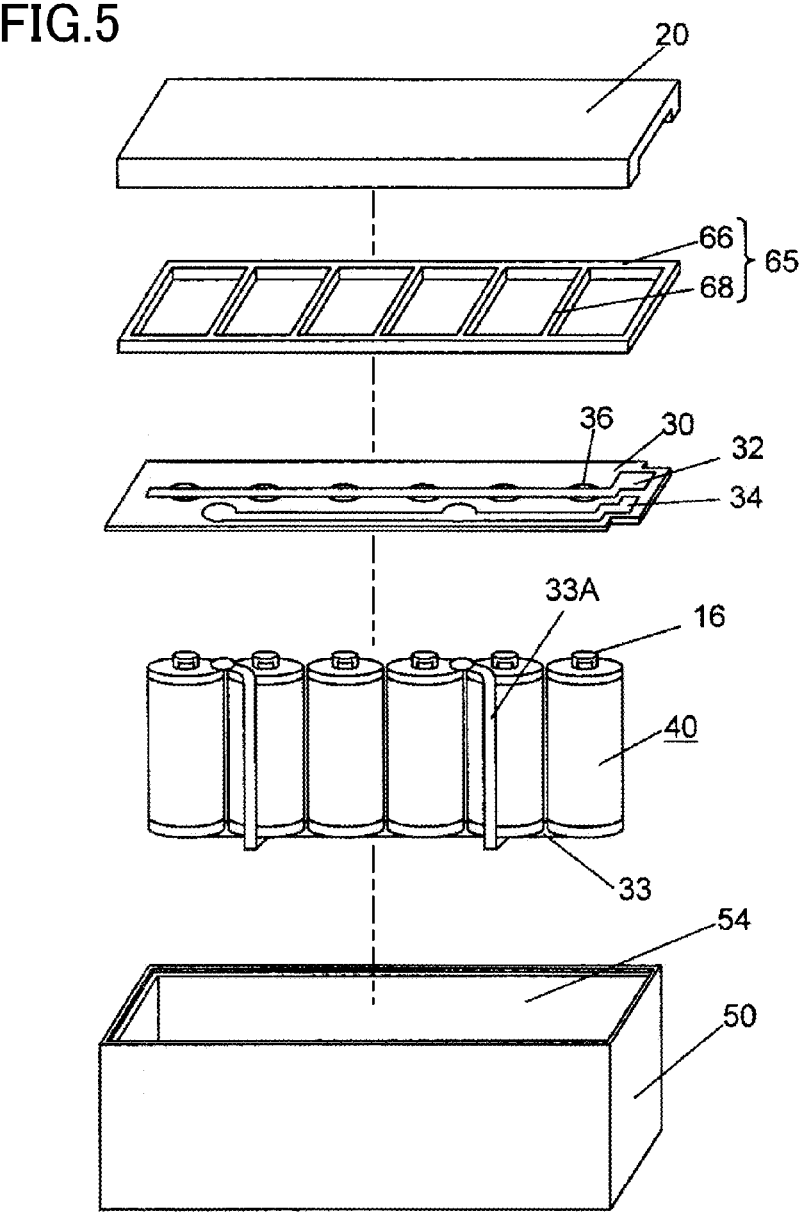
FIG. 5 is an exploded perspective view illustrating another example of the battery module of the first embodiment of the present invention.

Moreover, in the present embodiment, a structure in which the lid body 20 is fitted into the housing 50 to support the circuit board 30 by the external walls 22 of the lid body 20, the housing 50, and the upper surfaces 5A of the battery cases 5 has been described, but the present invention is not limited to this embodiment. For example, as illustrated in FIG. 5 which is an exploded perspective view of a battery module, a supporting member 65 configured to support the circuit board 30 may be interposed between the lid body 20 and the circuit board 30. In this case, the supporting member 65 includes an external frame 66 for supporting at least an external circumferential portion of the circuit board 30, and supporting portions 68. The supporting portions 68 are provided in positions facing the housing 50, and facing positions at which the upper surfaces 5A of the battery cases 5 are in contact with each other. Here, when the space of the exhaust chamber of the lid body 20 is reduced due to the supporting portions 68 of the supporting member 65, a recessed portion, a hole, or the like which is in communication with the opening of the lid body 20 may be provided in part of the supporting portion 68. In this way, it is possible to ensure fixing of the circuit board 30 by the housing 50, the upper surfaces 5A of the battery cases 5, and the supporting portions 68 of the supporting member 65. As a result, deformation of the circuit board due to pressure caused by emitted gas is reduced, and heat or gas entering battery cases of neighboring batteries is more efficiently reduced, so that it is possible to obtain a battery module having further improved reliability and safety.

Figure 6:
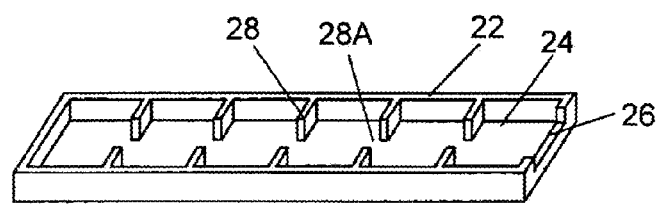
FIG. 6 is a perspective view illustrating another example of the lid body of the first embodiment of the present invention.

Alternatively, in the exhaust chamber 24 of the lid body 20, rib portions 28 each having an opening hole 28A may be provided in positions facing the housing 50 and the upper surfaces 5A of the battery cases 5 as illustrated in FIG. 6, instead of providing the supporting member 65. In this way, the circuit board 30 can be fixed by the housing, the upper surfaces 5A of the battery cases 5, and the rib portions 28 of the lid body 20, and the size or the thickness of the battery module can further be reduced.

Moreover, in the present embodiment, the circuit board provided with the power supply interconnect such as the connector has been described by way of example, but the present invention is not limited to this embodiment. For example, the circuit board may be provided with voltage detecting interconnects for detecting voltages of batteries, or temperature sensing interconnects for sensing temperatures of the batteries. Here, temperature sensing devices such as thermistors are connected to the temperature sensing interconnects, and the temperature sensing devices are brought into contact with the batteries, so that the sensing devices can sense the temperatures of the batteries. In this way, the voltages and the temperatures of the plurality of batteries can individually be detected and controlled. As a result, control is possible in consideration of, for example, variations of the characteristics or aging variation of the batteries, so that it is possible to further increase reliability and safety. Note that the pattern width of the voltage detecting interconnects or the temperature sensing interconnects on the circuit board can significantly be smaller than that of the power supply interconnect. This is because a high current flows through the power supply interconnect, and thus power loss due to interconnect resistance has to be reduced, whereas the voltage detecting interconnects or the temperature sensing interconnects can perform detection/sensing by a very low current. Thus, the power supply interconnect and pairs of the voltage detecting interconnects and the temperature sensing interconnects can efficiently be arranged on the circuit board, so that space required for interconnection can significantly be reduced.

Figure 7:
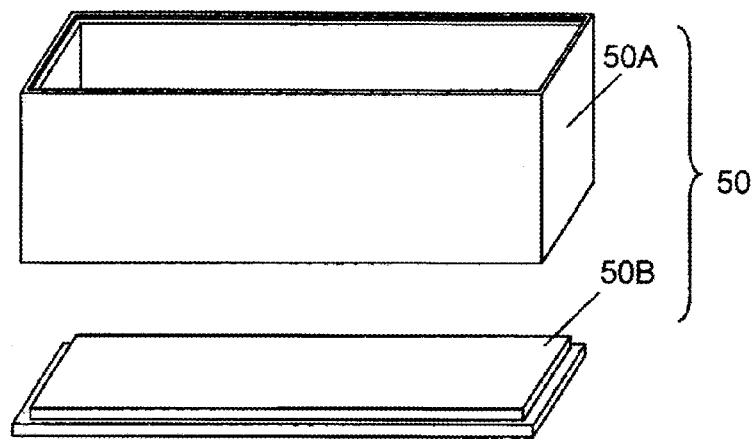
FIG. 7 is an exploded perspective view illustrating another example of the housing of the first embodiment of the present invention.
Figure 8:
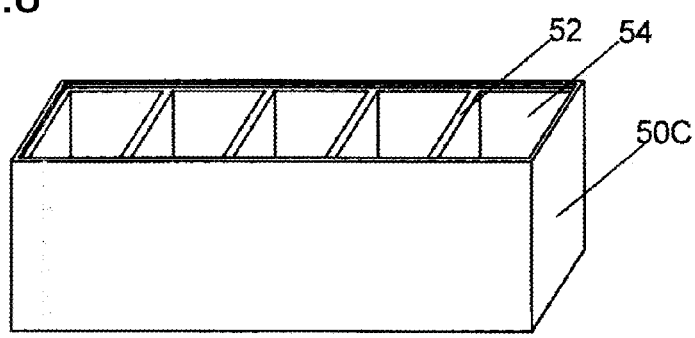
FIG. 8 is an exploded perspective view illustrating yet another example of the housing of the first embodiment of the present invention.

Moreover, in the present embodiment, the housing having an opening end on its one side has been described by way of example, but the present invention is not limited to this embodiment. For example, as illustrated in FIG. 7, a housing 50 may include a frame body 50A and a closing member 50B. The frame body 50A has opening ends on both ends thereof to store a plurality of batteries. The closing member 50B closes one of the opening ends. With this configuration, assembly properties and workability such as connection of the batteries to the circuit board or to the connection plate are improved, thereby obtaining a battery module having high productivity. Alternatively, a frame body 50C having a partition portion 52 for individually storing batteries as illustrated in FIG. 8 can be used instead of the frame body 50A of FIG. 7. With this configuration, transmission or dissipation of excessive heat generated in a battery having a problem to neighboring batteries can further be reduced by the partition portion 52. Thus, it is possible to obtain a battery module having higher reliability and higher safety.

Figure 9:
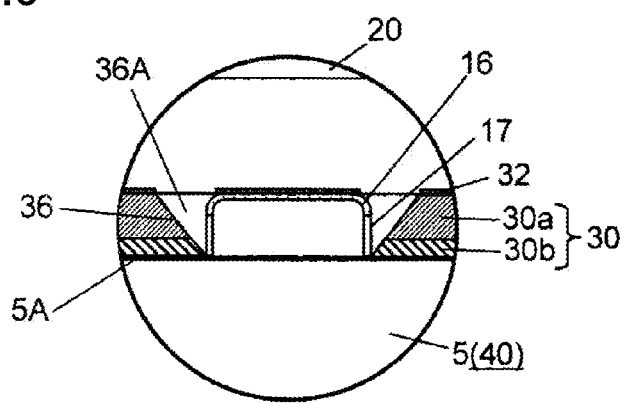
FIG. 9 is an enlarged cross-sectional view illustrating a part of another example of the circuit board of the first embodiment of the present invention.

Moreover, in the present embodiment, the case where the shape of the through hole formed in the circuit board is the same in the thickness direction has been described by way of example, but the present invention is not limited to this embodiment. For example, as illustrated in FIG. 9, the size of the through hole can be smaller at a position of the circuit board closely in contact with the upper surface of the battery case than at a position of the circuit board close to the connector 32. With this configuration, the release efficiency of gas emitted from the opening portion of the positive electrode cap of the battery into the exhaust chamber of the lid body can be increased (the release resistance can be reduced). Furthermore, the area where the circuit board is closely in contact with the upper surface of the battery case is increased to significantly reduce gas entering the battery case side, so that reliability and safety can be improved.

Second Embodiment

Figure 10:
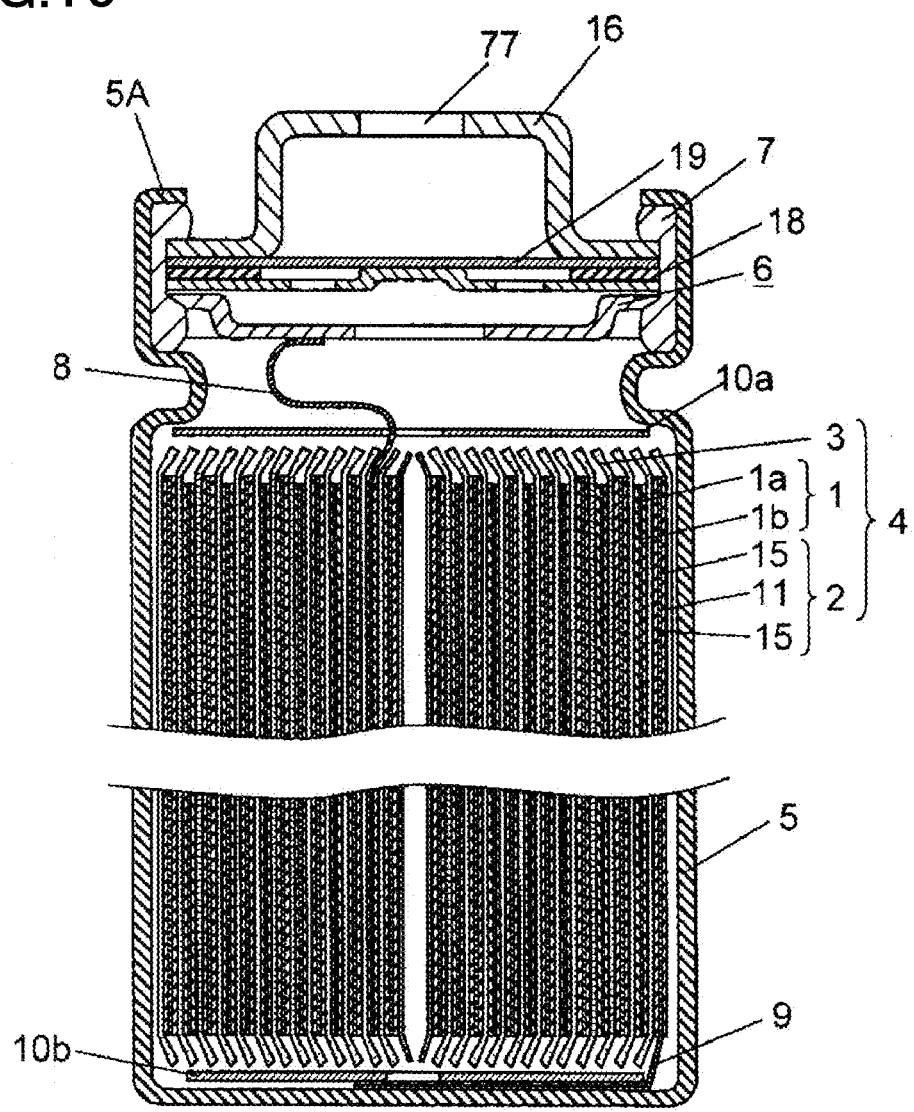
FIG. 10 is a cross-sectional view illustrating a battery included in a battery module of a second embodiment of the present invention.

FIG. 10 is a cross-sectional view of a battery included in a battery module of a second embodiment of the present invention.

As illustrated in FIG. 10, the battery of the present embodiment is different from the battery of the first embodiment in that an upper surface of a positive electrode cap 16 serving as an electrode portion of the battery is provided with an opening portion 77. Note that components other than batteries are the same as those of the first embodiment, and thus the description thereof may be omitted.

The battery module including the batteries of the present embodiment will be described in detail below with reference to FIGS. 11A-11C, and 12.

Figure 11A:
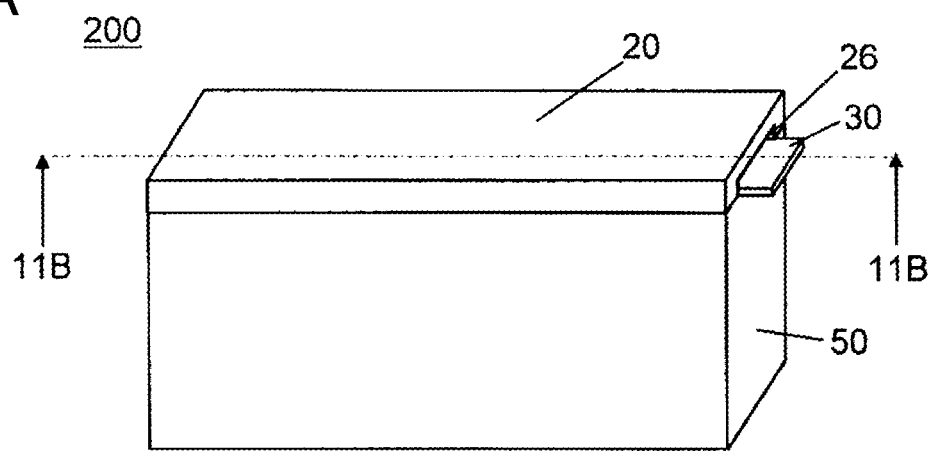
FIG. 11A is a perspective view of the battery module of the second embodiment of the present invention.
Figure 11B:
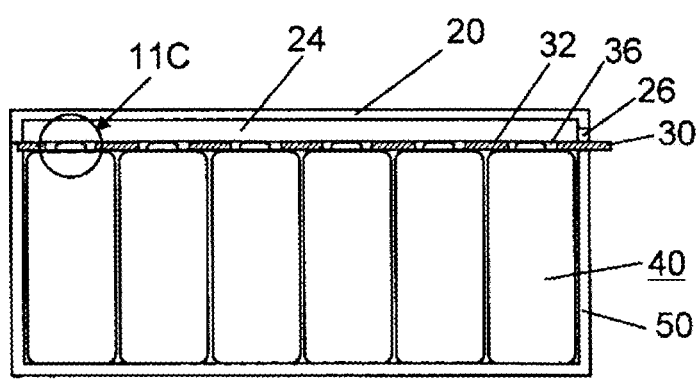
FIG. 11B is a cross-sectional view along the line 11B-11B of FIG. 11A.
Figure 11C:
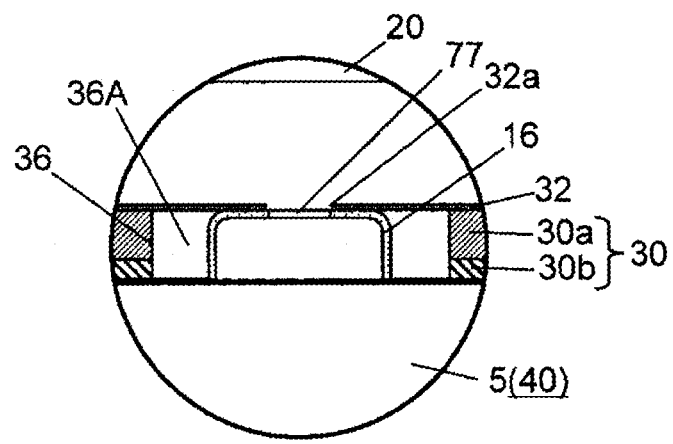
FIG. 11C is an enlarged cross-sectional view of the part 11C of FIG. 11B.
Figure 12:
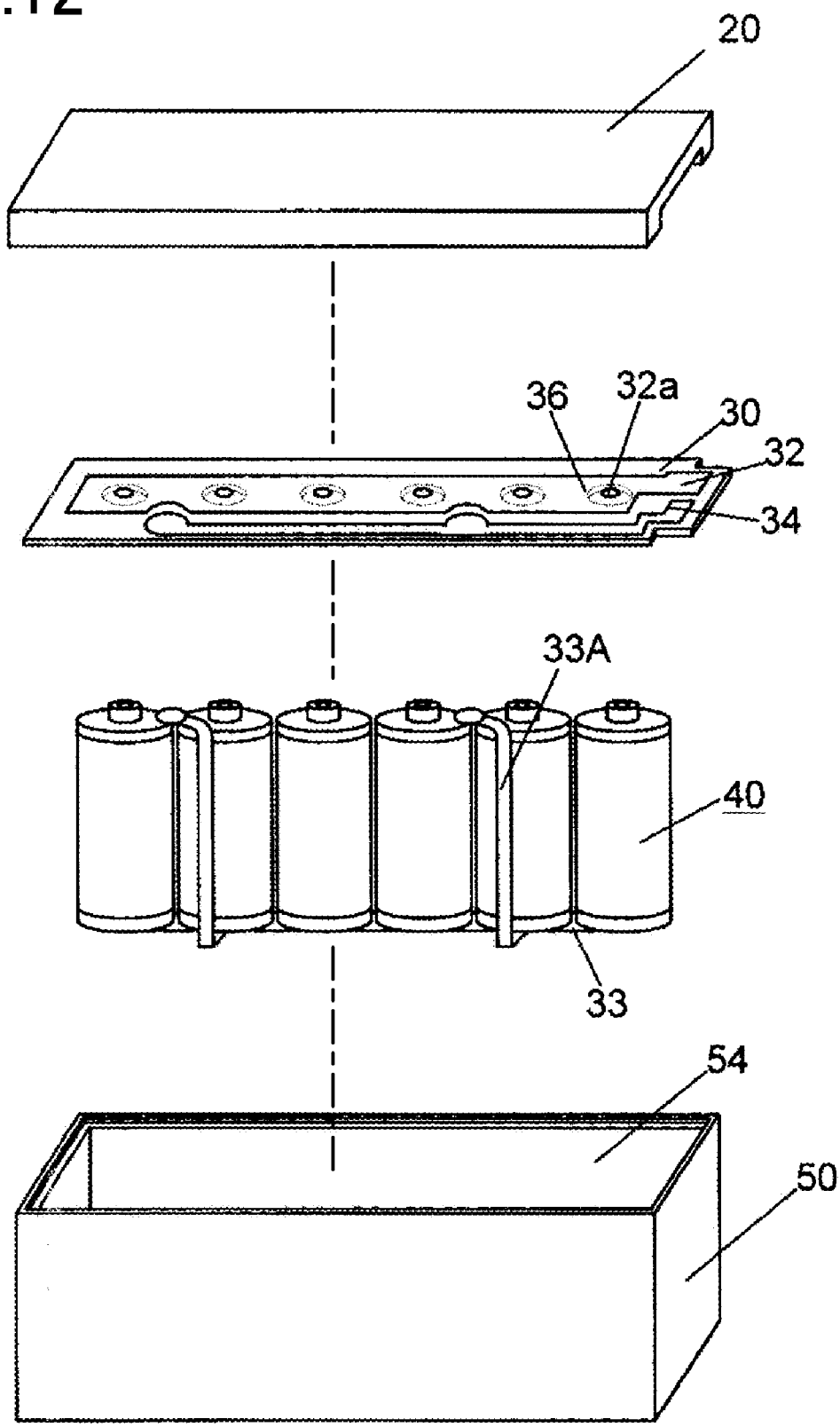
FIG. 12 is an exploded perspective view of the battery module of the second embodiment of the present invention.

FIG. 11A is a perspective view illustrating the battery module of the second embodiment of the present invention. FIG. 11B is a cross-sectional view along the line 11B-11B of FIG. 11A. FIG. 11C is an enlarged cross-sectional view of the part 11C of FIG. 11 B. FIG. 12 is an exploded perspective view of the battery module of the second embodiment of the present invention.

As illustrated in FIGS. 11A and 12, a battery module 200 includes a housing 50, and a lid body 20 fitting into the housing 50. The housing 50 is made of an insulating resin material or a metal material whose surface is covered by a resin for insulation.

As illustrated in FIGS. 11B and 12, a plurality of batteries are stored in a storage portion 54 of the housing 50. Positive electrode caps of the batteries are aligned in the same direction, and electrically connected in parallel by a connector 32 of a circuit board 30. Moreover, a connection plate 33 by which bottoms each serving as one of electrode portions (negative electrode) of the battery are connected in parallel is connected to a connector 34 of the circuit board 30 by extension portions 33A each extending from a part of the connection plate 33.

Moreover, as illustrated in FIG. 11C, the positive electrode caps 16 protruding from battery cases 5 are inserted inside through holes 36 in the circuit board 30, where the through holes 36 are provided for the batteries, respectively. The positive electrode caps 16 are connected to the connector 32. The circuit board 30 is in contact with and closely attached to the battery cases 5, and each through hole 36 has a gap 36A between its inner side surface and the positive electrode cap 16. Here, the connector 32 has a through hole 32a in a position corresponding to the opening portion 77 so that the opening portion 77 formed in the upper surface of the positive electrode cap 16 is not covered. Gas emitted through the opening portion 77 of the positive electrode cap 16 on the occurrence of a problem in the battery is released via the through hole 32a.

Then, as illustrated in FIGS. 11B and 12, the emitted gas passes through the through hole 32a of the connector 32 of the circuit board 30 and through an exhaust chamber (not shown) of the lid body 20, and then is released from an opening 26 in communication with the outside.

Components included in the battery module 200 will be described below with reference to the drawings. Note that the configurations of the housing 50 and the lid body 20 of the battery module 200 are the same as those of the first embodiment, and thus the description thereof is omitted, and the circuit board which is different from that of the first embodiment will mainly be described.

As illustrated in FIGS. 11C and 12, the circuit board 30 has a layered structure including at least two layers, a heat-resistant member 30a made of, for example, a glass and epoxy substrate or polyimide, and an elastic member 30b having, for example, rubber elasticity. The elastic member 30b elastically deforms and comes closely in contact with the upper surfaces 5A of the battery cases 5, thereby ensuring a high degree of air-tightness.

Moreover, the circuit board 30 includes the connector 32 and the connector 34. The connector 32 is to be connected to the positive electrode caps 16 of the batteries of the battery module, the positive electrode caps 16 being inserted in the through holes 36. The connector 34 is to be connected to the extension portions 33A of the connection plate 33 connecting the other electrodes of the batteries (e.g., negative electrodes) in parallel. The connector 32 is provided with through holes 32a so that the connector 32 does not cover the opening portions 77 of the positive electrode caps 16.

In this way, batteries of battery modules can be connected by the circuit board, so that it is possible to significantly reduce space required for routing a power supply interconnect or a control interconnect. Moreover, the opening portion of the positive electrode cap of each battery is directly in communication with an exhaust chamber 24 of the lid body 20 via the through hole 32a of the connector 32. Therefore, gas emitted from a battery in a failure state is not directly emitted to the circuit board 30, and thus deformation of the circuit board 30 can significantly be reduced. As a result, even if the gas is ignited for combustion, it is possible to significantly reduce the gas and flames entering neighboring battery cases.

The operation and advantages of the battery module 200 of the present embodiment in case of, for example, excessive heat generation in one of the batteries connected in parallel in the battery module 200 will be described below with reference to FIGS. 13A and 13B.

Figure 13A:
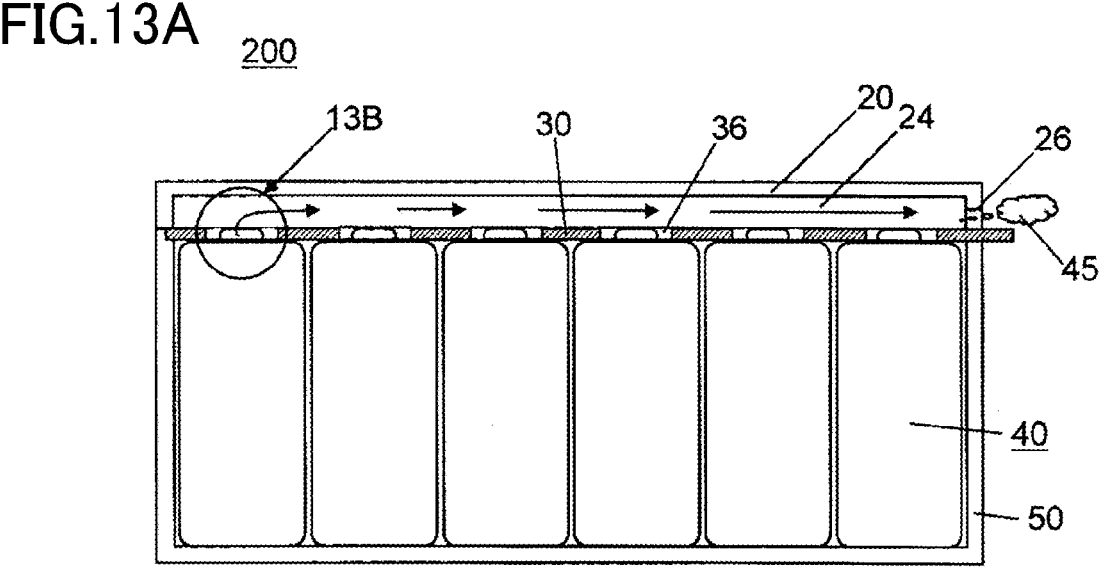
FIG. 13A is a cross-sectional view illustrating exhaustion of gas emitted in case of, for example, excessive heat generation in one of the batteries of the battery module of the second embodiment of the present invention.

FIG. 13A is a cross-sectional view illustrating exhaustion of gas emitted in case of, for example, excessive heat generation in one of the batteries in the battery module 200 of the present embodiment. FIG. 13B is an enlarged cross-sectional view illustrating the part 13B of FIG. 13A.

Figure 13B:
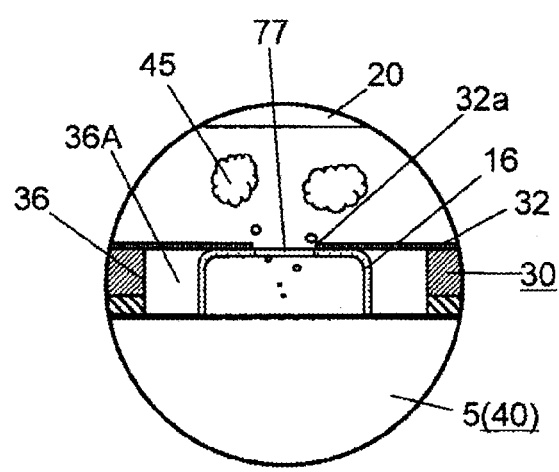
FIG. 13B is an enlarged cross-sectional view of the part 13B of FIG. 13A.

First, as illustrated in FIG. 13B, excessive heat is generated in one of the batteries of the battery module 200, which increases the gas pressure of gas generated in the battery case, thereby operating, for example, a safety valve serving as a vent mechanism, so that gas 45 is emitted from the battery case 5.

Next, as illustrated in FIG. 13A, the emitted gas 45 is emitted from the opening portion 77 of the positive electrode cap 16 via the through hole 32a of the connector 32 into the exhaust chamber 24 of the lid body 20. Then, the gas is eventually released outside the battery module 200 through the opening 26 provided in the lid body 20.

In the battery module 200 of the present invention, the gas 45 is exhausted in a gaseous state via the through hole 32a of the connector 32 of the circuit board 30. Therefore, explosive expansion due to ignition of the gas is not caused. Thus, there is no rupture of the battery module.

According to the present embodiment, the plurality of batteries are stored in the storage portion of the housing, under a sealed state by at least the circuit board and the housing, and gas emitted from a battery having a problem can be released, in a gaseous state, from the through hole of the connector of the circuit board through the exhaust chamber of the lid body outside the battery module. As a result, it is possible to obtain a battery module in which the gas is not ignited for combustion or to generate smoke, and which is highly safe.

Moreover, the plurality of batteries can be stored in the storage portion of the housing, under the sealed state by at least the circuit board and the housing, so that it is not necessary to individually store the batteries. As a result, the battery module can easily be downsized. Moreover, space required for routing the power supply interconnect or the control interconnect can significantly be reduced by the circuit board. As a result, it is possible to obtain a battery module which is smaller in size, and has high safety and high reliability.

Figure 14A:
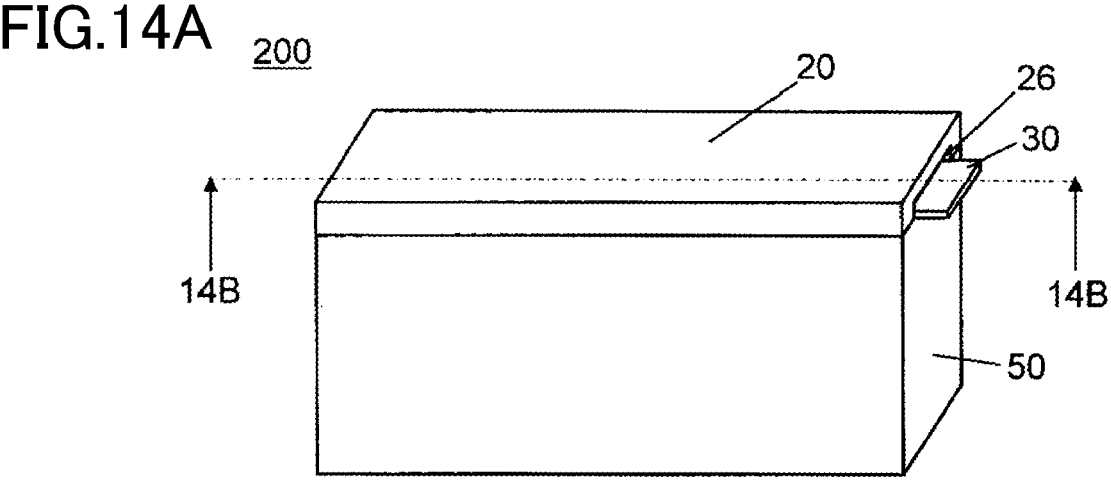
FIG. 14A is a perspective view of another example of the battery module of the second embodiment of the present invention.
Figure 14B:
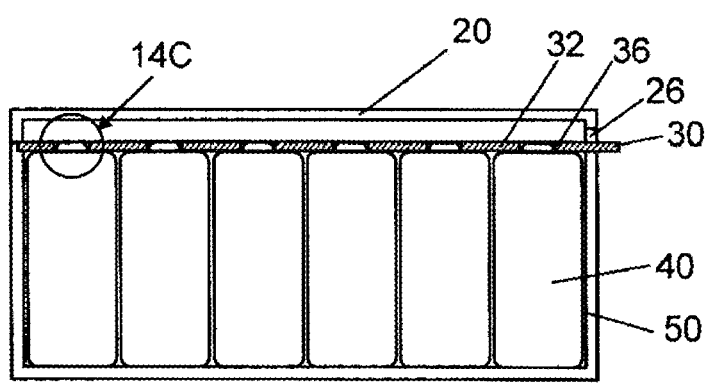
FIG. 14B is a cross-sectional view along the line 14B-14B of FIG. 14A.
Figure 14C:
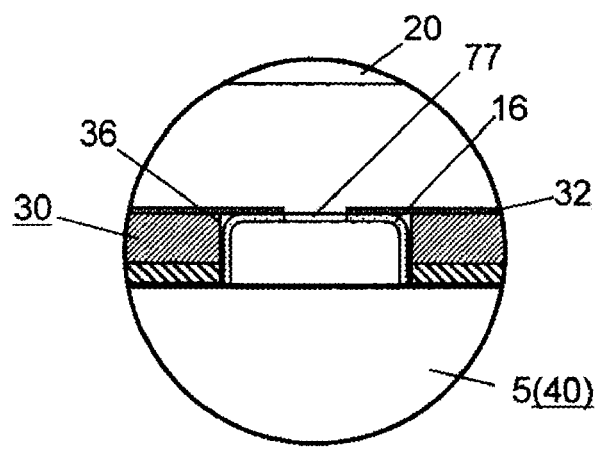
FIG. 14C is an enlarged cross-sectional view of the part 14C of FIG. 14B.

Note that in the present embodiment, a configuration having the gap 36A between the positive electrode cap 16 of the battery and the circuit board in the through hole 36 of the circuit board in which the positive electrode cap 16 is inserted has been described by way of example, but the present invention is not limited to this embodiment. For example, as illustrated in FIGS. 14A-14C, through holes may have a shape substantially the same as that of the positive electrode caps 16. In this way, positioning of the opening portion 77 of each battery to the corresponding through hole 32a of the connector is easy, and variations in opening area of the through holes 32a due to displacement can be reduced. As a result, it is possible to obtain a battery module having higher reliability and safety.

Moreover, it is, of course, possible to apply the configuration described in the first embodiment with reference to FIGS. 5-8 to the battery module of the second embodiment, and similar advantages can be obtained.

Third Embodiment

A battery pack of a third embodiment of the present invention will be described in detail below with reference to FIGS. 15A and 15B.

Figure 15A:
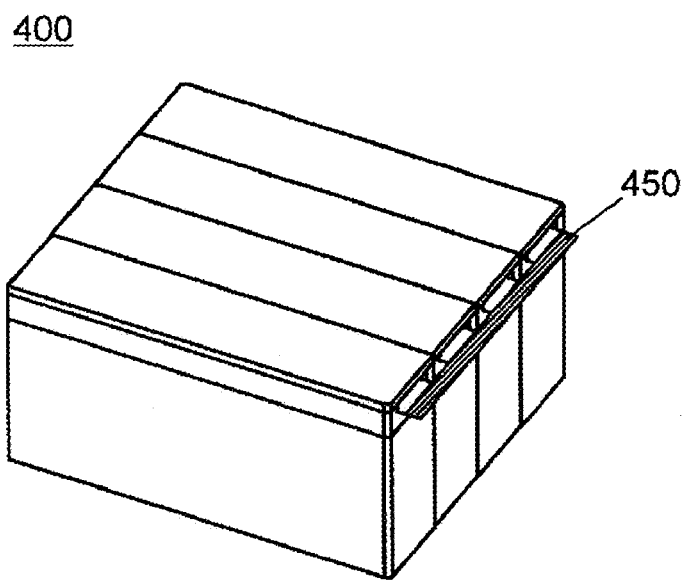
FIG. 15A is an assembled perspective view illustrating a battery pack of a third embodiment of the present invention.
Figure 15B:
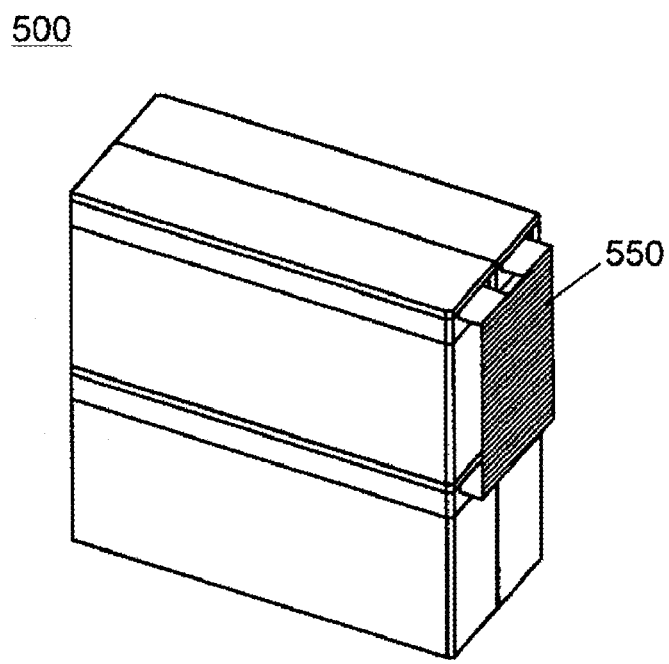
FIG. 15B is an assembled perspective view illustrating another example of the battery pack of the third embodiment of the present invention.

FIGS. 15A and 15B are assembled perspective views of the battery pack of the third embodiment of the present invention.

In FIG. 15A, four battery modules of the above embodiments are arranged in parallel, and are connected by a connection member 450, thereby forming a battery pack 400. Alternatively, in FIG. 15B, battery modules of the above embodiments are parallelly arranged in pairs, the obtained two pairs of the battery modules are stacked in two tiers in the vertical direction, and are connected by a connection member 550, thereby forming a battery pack 500. Here, the battery modules are connected by the connection member, in parallel, in series, or in parallel and in series, thereby forming the battery pack.

According to the present embodiment, highly versatile battery packs having a required voltage and electric capacity can easily be obtained by arbitrarily combining battery modules in consideration of installation space depending on the application.

Moreover, according to the present embodiment, as in the above embodiments, even when a problem occurs in any one of the battery modules, emitted gas is not ignited, and can be exhausted, in a gaseous state, to the outside. As a result, explosive expansion due to ignition of gas is not caused. Thus, it is possible to obtain a battery pack in which no battery module ruptures, and which is safe and has high reliability.

Other Embodiments

Other embodiments of the battery module of the present invention will be described below with reference to FIG. 16.

Figure 16:
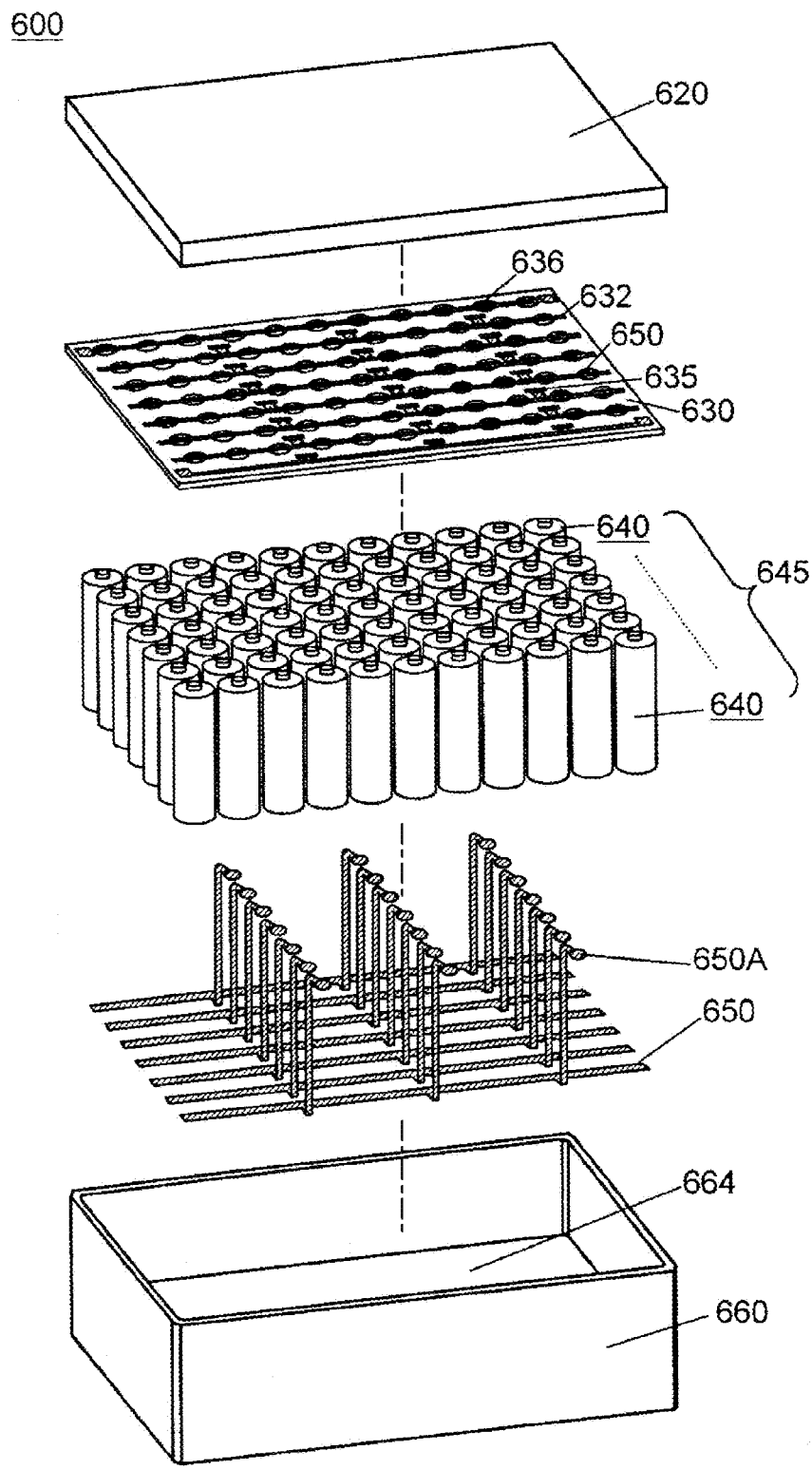
FIG. 16 is an exploded perspective view illustrating a battery module in another embodiment of the present invention.

FIG. 16 is an exploded perspective view illustrating a battery module 600 of another embodiment of the present invention. Here, the battery module 600 is different from those of the above embodiments in that a plurality of battery units 640 each including batteries connected in parallel are two-dimensionally arranged, is connected in series, and is integrally stored. Note that in FIG. 16, the battery module 600 will be described by way of example, where the battery module 600 includes seven battery units 640 connected in series, and each battery unit 640 includes eleven batteries connected in parallel. For example, when lithium ion batteries each having a capacity of 2500 mAh and an average voltage 3.6 V are used, a battery unit set 645 having a voltage of 25.2 V (3.6 V×7) and a capacity of 27.5 Ah (2.5 Ah×11) is obtained.

That is, as illustrated in FIG. 16, the battery module 600 includes a housing 660 having a storage portion 664, the battery unit set 645 which is stored in the storage portion 664, and in which seven battery units each including eleven batteries connected in parallel are connected in series, a circuit board 630 and connection plates 650 by which the batteries included in the battery unit set 645 are connected in series and in parallel, and a lid body 620 fitting into the housing 660 in which these members are stored under a sealed state.

The circuit board 630 includes through holes 636 in positions corresponding to positive electrode caps of the batteries of the battery unit set 645. The circuit board 630 is provided with connectors 632 such that the connectors 632 do not completely cover the through holes 636. The connectors 632 connect the batteries included in the battery units 640 in parallel. The circuit board 630 is, as in the above embodiments, arranged closely in contact with upper surfaces of battery cases.

Moreover, each connection plate 650 parallelly connects negative electrodes each serving as one of electrode portions of the battery of the battery unit 640, and is connected to connection portions 635 of the circuit board 630 via extension portions 650A provided at portions of the connection plate 650. The connection rand portions 635 are connected to the connector 632 of a neighboring battery unit 640, thereby connecting the battery units 640 in series.

Moreover, the lid body 620 includes an opening (not shown) to release emitted gas via an exhaust chamber (not shown) to the outside. Here, the opening may include openings provided for the battery units 640, respectively, or one opening may be provided for all the battery units 640.

According to the above embodiments, it is possible to obtain advantages similar to those of the first and second embodiments, and to obtain a battery module which is further downsized by integrally forming the housing.

Note that in the embodiments, a battery shape in which the positive electrode cap 16 serving as an electrode portion protrudes from the upper surface 5A of the battery case 5 has been described by way of example, but the present invention is not limited to this embodiment. For example, as described below with reference to FIGS. 17, 18A, and 18B, a battery module may include batteries each having a positive electrode cap 16 provided to substantially be flush with an upper surface 5A of a battery case 5.

Figure 17:
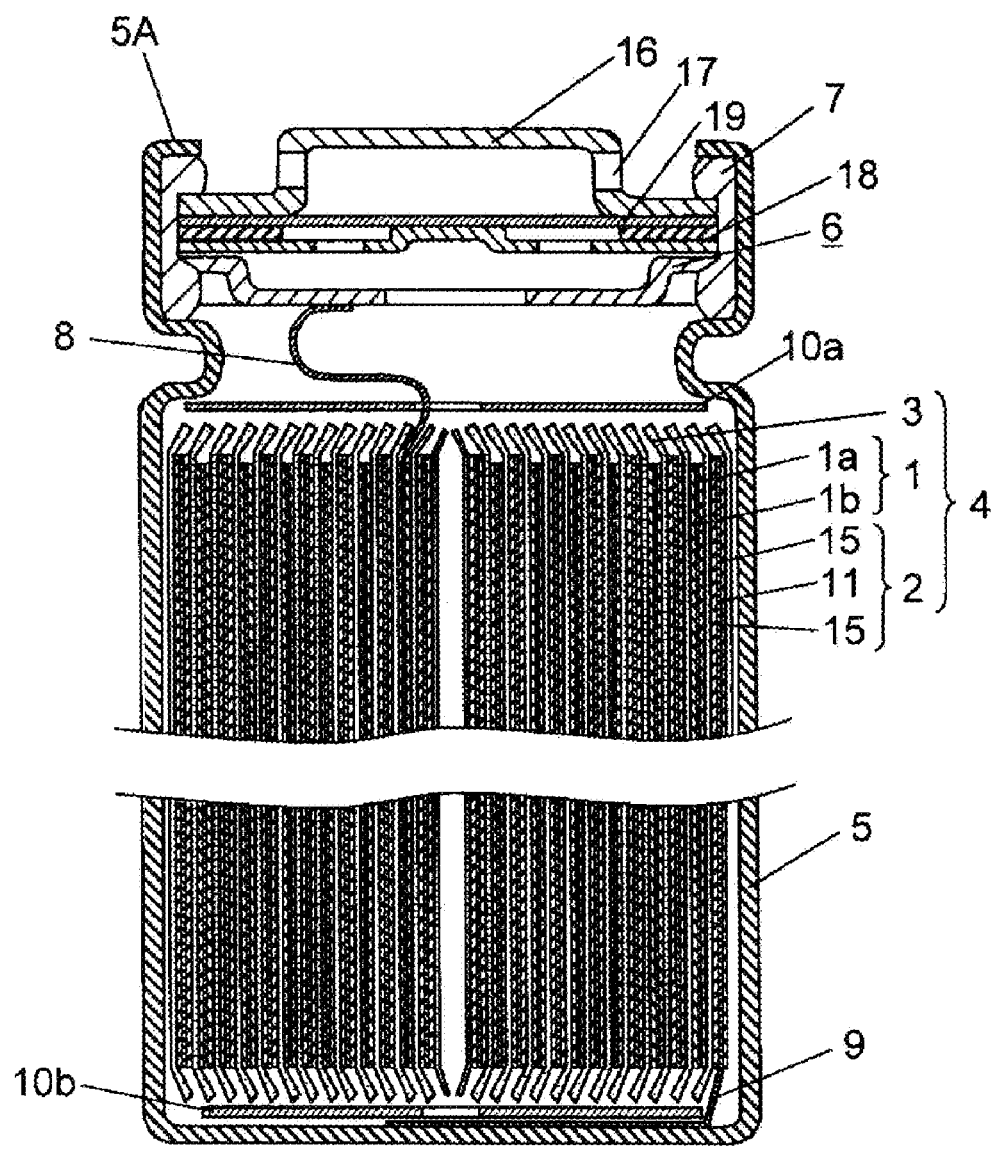
FIG. 17 is a cross-sectional view illustrating the shape of another battery included in the battery modules of the embodiments of the present invention.
Figure 18A:
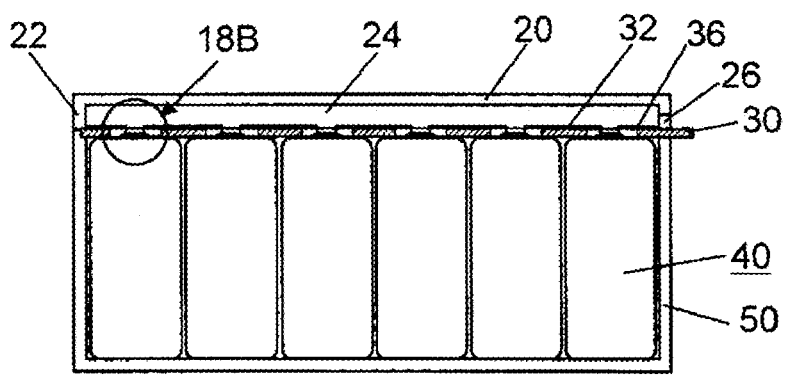
FIG. 18A is a cross-sectional view of the battery module of the embodiments of the present invention, wherein multiple ones of the battery of FIG. 17 are used.
Figure 18B:
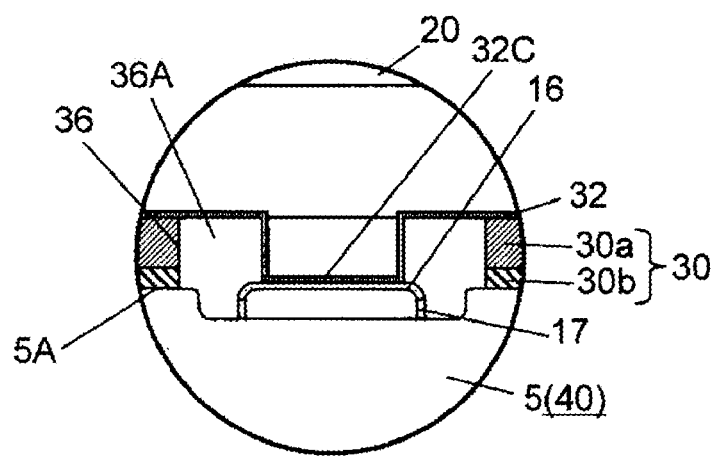
FIG. 18B is an enlarged cross-sectional view of the part 18B of FIG. 18A.

FIG. 17 is a cross-sectional view illustrating the shape of another battery included in the battery modules of the embodiments of the present invention. FIG. 18A is a cross-sectional view of the battery module of the embodiments of the present invention, wherein multiple ones of the battery of FIG. 17 are used. FIG. 18B is an enlarged cross-sectional view of the part 18B of FIG. 18A.

That is, as illustrated in FIGS. 18A and 18B, the present embodiment is different from the above embodiments in that the positive electrode cap 16 provided to substantially be flush with the upper surface 5A of the battery case 5 is connected to a connector 32 of a circuit board 30, wherein the circuit board 30 is provided with through holes 36 at positions corresponding to the positive electrode caps 16, and the connector 32 is in a form of a downwardly convex portion 32C. The other configurations are the same as those of the above embodiments, and thus the description thereof is omitted.

With this configuration, advantages similar to those of the above embodiments can be obtained. Moreover, regardless of the positional relationship of the positive electrode caps of the electrode portions of the batteries, a thin and small battery module 300 can be obtained. Note that the examples described in the embodiments are, of course, applicable to this embodiment.

Moreover, in the embodiments, charge/discharge of the battery module, and control circuits for detecting and controlling temperature or voltages are not described in particular or illustrated in the figures, but the control circuits may, of course, be provided outside or inside the battery module.

Moreover, in the embodiments, cylindrical batteries are described as the battery modules by way of example, but the invention is not limited to these embodiments. For example, square batteries can be used.

Moreover, in the embodiments, their configurations are compatible with each other.

INDUSTRIAL APPLICABILITY

The present invention is applicable to battery modules and battery packs for vehicles, bicycles, or electric tools, in particular, hybrid vehicles or electric vehicles which require large capacities, high voltages, and also high reliability and safety.

DESCRIPTION OF REFERENCE CHARACTERS

1 Positive Electrode
1a Positive Electrode Current Collector
1b Positive Electrode Layer
2 Negative Electrode
3 Separator
4 Electrode Group
5 Battery Case
5A Upper Surface
6 Sealing Plate
7 Gasket
8 Positive Electrode Lead
9 Negative Electrode Lead
10a, 10b Insulating Plate
11 Negative Electrode Current Collector
15 Negative Electrode Layer
16 Positive Electrode Cap (Electrode Portion)
17, 77 Opening Portion
18 Current Cutoff Member
19 Vent Mechanism
20, 620 Lid Body
22 Outer Circumferential Wall
24 Exhaust Chamber
26 Opening
28 Rib Portion
28A Opening Hole
30, 630 Circuit Board
30a Heat-Resistant Member
30b Elastic Member
32, 34, 632 Connector
32a Through Hole
32C Convex Portion
33, 650 Connection Plate
33A, 650A Extension Portion
36, 636 Through Hole
36A Gap
40, 640 Battery Unit
45 Gas
50, 660 Housing
50A, 50C Frame Body
50B Closing Member
52 Partition Portion
54, 664 Storage Portion 65 Supporting Member
66 External Frame
68 Supporting Portion
100, 200, 300, 600 Battery Module
400, 500 Battery Pack
450, 550 Connection Member
635 Connection Portion
645 Battery Unit Set

The invention claimed is:

1. A battery module comprising:
a housing;
a plurality of batteries aligned and accommodated in the housing; and
a circuit board including through holes, wherein:
each of the batteries has an opening portion disposed at an electrode portion of the battery to release gas generated in the battery outside the battery,
the circuit board is disposed in contact with battery cases around the electrode portions of the batteries,
the housing is partitioned by the circuit board into a storage portion and an exhaust chamber so that the plurality of batteries are stored in the storage portion and the gas released from the opening portion is exhausted outside the housing via the exhaust chamber,
the electrode portions of the batteries are connected to a connector formed on the circuit board, and
the electrode portions of the batteries are inserted in the through holes such that the opening portions are in communication with the exhaust chamber via the through holes.

2. The battery module of claim 1, wherein:
the circuit board has a layered structure including a heat-resistant member and an elastic member, and
a lower surface of the elastic member is in contact with the battery cases.

3. The battery module of claim 1, wherein:
the connector is formed on an upper surface of the circuit board, and
a lower surface of the circuit board is in contact with the battery cases.

4. The battery module of claim 3, wherein
a height of each electrode portion is substantially the same as a thickness of the circuit board.

5. The battery module of claim 3, wherein
a size of each through hole formed in the circuit board is smaller on a side on which the circuit board is in contact with the battery case than on a side on which the circuit board is provided with the connector.

6. The battery module of claim 1, wherein:
the opening portion is provided at an upper surface of the electrode portion, and
the connector connected to the electrode portions has through holes formed at least in positions of the connector corresponding to the opening portions.

7. The battery module of claim 6, wherein
the gas released from the opening portion is released into the exhaust chamber via the through hole.

8. The battery module of claim 1, wherein
the connector connected to the electrode portions is formed to straddle the plurality of through holes formed in the circuit board.

9. The battery module of claim 1, wherein:
the opening portion disposed at each electrode portion is provided at a side surface of the electrode portion, and
a gap is provided between the circuit board and the electrode portion in each through hole formed in the circuit board.

10. The battery module of claim 9, wherein
the gas released from the opening portion is released into the exhaust chamber through the gap.

11. The battery module of claim 1, wherein
the plurality of batteries are connected in parallel by the connector connected to the electrode portions of the batteries.

12. The battery module of claim 1, wherein
the storage portion is sealed by the circuit board.

13. The battery module of claim 1, wherein
the housing is made of a metal material having an insulated surface.

14. The battery module of claim 1, wherein:
the housing includes a lid body,
partition portions are provided in the storage portion in such a manner that the batteries are individually stored, and
the lid body includes rib portions at positions facing the partition portions in the housing.

15. The battery module of claim 1, wherein:
the housing includes a lid body, and
a supporting member for holding the circuit board is further provided between the lid body and the circuit board.

16. A battery pack comprising:
multiple ones of the battery module of any one of claim 1, wherein
the battery modules are aligned and connected in series and/or parallel.

17. The battery module of claim 1, wherein the circuit board is disposed inside the housing and a part of the circuit board extends from the housing to outside the housing.

* * * * *